Patented June 3, 1952

2,598,936

UNITED STATES PATENT OFFICE 2,598,936

DISUBSTITUTED CYANOALKANOYLUREAS AND THIOUREAS AND METHODS FOR THEIR PRODUCTION

Viktor Papesch, Morton Grove, and Elmer F. Schroeder, Chicago, Ill., assignors to G. D. Searle & Co., Chicago, Ill., a corporation of Illinois No Drawing. Application April 13, 1950,
Serial No. 155,778

2 Claims. (Cl. 260—465.5)

The present invention is concerned generally with organic nitriles and more particularly with compounds of the general structural formula.

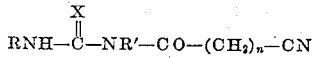

wherein $n$ is an integer smaller than 3, X is a chalcogen, R and R' represent members of the group consisting of alkyl, cycloalkyl and aralkyl radicals and wherein one of the radicals R and R' contains a minimum of three carbon atoms. In the foregoing structural formula X represents a chalcogen or non-metallic element of group 6 such as oxygen and sulfur. Among the radicals which one of the substituents R and R' may represent are normal and branched chain propyl, butyl, amyl, hexyl and octyl radicals, cyclopropyl, cyclobutyl, cyclopentyl, cyclohexyl, benzyl, phenethyl and phenylpropyl radicals, the other substituent being a member of the same group, methyl or ethyl. The R and R' groups may be different or identical.

The nitriles of this invention have been found to possess useful therapeutic properties, particularly as cardiovascular, diuretic and chemotherapeutic agents. Further, they are valuable intermediates for the production of other medicinal agents such as uracils, thiouracils, xanthines and thioxanthines. The uracils and thiouracils formed by cyclization of certain of these nitriles are described in our copending applications, Serial No. 138,074, filed January 11, 1950, now Patent No. 2,567,651, and Serial No. 141,836, filed February 1, 1950. The present application constitutes a continuation-in-part of these applications.

The prior art discloses several N,N'-dialkyl substituted N-cyanoacetylureas in which the alkyl group represents methyl and ethyl radicals. However, these compounds have not been found therapeutically useful, whereas the nitriles of this invention have shown a high degree of pharmacodynamic effectiveness. Thus in pharmacological trials in rats, using the Lipschitz method of evaluating diuresis, (Journal of Pharmacology and Experimental Therapeutics, 79, 97; 1943) the N-ethyl-N'-isopropyl-N-cyanoacetylurea far surpasses such standard diuretics as theophylline and theobromine in effectiveness. Furthermore, such nitriles are much less toxic than these xanthines and lack such undesirable side effects as the tendency to produce emesis.

The compounds of our invention may be prepared by a number of methods. One of the preferred procedures is to heat the 1,3-disubstituted urea or thiourea with acetic anhydride and cyanoacetic acid or cyanopropionic acid for 30 to 200 minutes at 50–100° C. We have discovered that in the case of unsymmetrically substituted 1,3-dialkyl ureas and thioureas the substitution of the cyanoacyl group occurs primarily at the nitrogen atom to which the smaller alkyl group is attached. Thus, if R is a radical containing more carbon atoms than R', the substitution occurs primarily as follows:

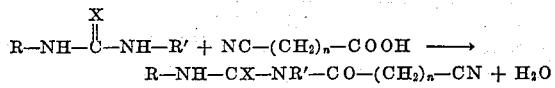

If the R and R' groups are very similar in size, a mixture of isomers will be formed.

In the condensation of the cyanoaliphatic acid with the urea or thiourea a substantial saving in the amount of acetic anhydride necessary for optimal yield has been effected by use of glacial acetic acid in the process.

We have also developed new methods for preparing these compounds, wherein a substituted cyanoacylamine R'—NH—CO—(CH$_2$)$_n$—CN, is condensed with an isocyanate or isothiocyanate of the type R—N=C=X.

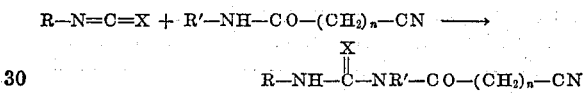

Obviously in this case it is immaterial whether or not the R group is larger or smaller than the R' group. However, the yields obtained by this method are inferior to those obtained with the method mentioned above.

On evaporation of the solvent used for the condensation under reduced pressure, the cyanoacylureas and thioureas are usually obtained as syrups, but in a few cases they become crystalline readily. The syrups may be further purified by high vacuum distillation. In order to establish their structure, the compounds in which $n$ was one, i. e., the cyanoacetyl derivatives, were usually converted to the corresponding 6-amino-1,2,3,4-tetrahydro-2,4-pyrimidinediones and 2-thio-6-amino-1,2,3,4-tetrahydro-2,4-pyrimidinediones of the formula.

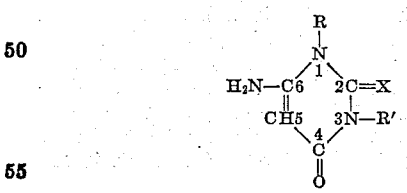

This cyclization is effected by heating with a dilute alkali solution. The position of the groups R and R' in the substituted pyrimidinediones was verified by alkylating or aralkylating in the 3-position the 1-monosubstituted 6-amino-1,2,3,4-tetrahydropyrimidinedione, the latter being derived from the monosubstituted cyanoacetyl urea of the type R—NH—CX—NH—CO—CH$_2$—CN.

A number of new N,N'-disubstituted ureas have been prepared and are described herein. We have found that one of the most economical and direct methods of preparing such ureas is to add one molecular equivalent of an alkyl carbaminoyl chloride to one molecular equivalent of an alkylamine in the presence of at least one equivalent of alkali with efficient cooling. The process may be represented schematically as follows:

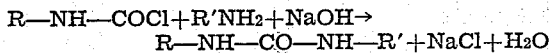

The following examples illustrate in detail certain of the compounds which comprise this invention, and methods of producing them. The invention is not to be construed as limited in spirit or in scope thereby. It will be apparent to those skilled in the art that many modifications in materials and methods may be made without departing from our invention. In these examples the temperatures are given in degrees centigrade, the parts by volume in milliliters (ml.), the parts by weight in grams (g.) and pressures during vacuum distillation in millimeters (mm.) or microns of mercury.

EXAMPLE 1

*N-methyl-N-cyanoacetyl-N'-isopropylurea*

A solution of 10 g. of methyl isocyanate in 50 ml. of benzene is cooled in ice and treated by the slow addition of an ice-cold solution of 15 g. of isopropylamine in 25 ml. of benzene. After completion of the addition, the benzene is removed by vacuum distillation. The residual syrup crystallizes on cooling to give 16 g. of practically pure N-isopropyl-N'-methylurea, melting at 92–94° C. On recrystallization from a mixture of 10 parts of ethyl acetate and 10 parts of ethyl ether, long needles melting at 94–96° C. are obtained.

A mixture of 25 g. of N-isopropyl-N'-methylurea, 22 g. of cyanoacetic acid and 50 ml. of acetic anhydride is heated for 2 hours at 70–80° C. in a water bath. The solvent is removed as completely as possible by vacuum distillation. 25 ml. of water is added to the residue and vacuum distillation completed. The syrup consists of N-methyl - N - cyanoacetyl - N' - isopropylurea. Distillation at 20 microns pressure yields a colorless liquid.

To establish the structure, the 1-isopropyl-3-methyl - 6 - amino - 1,2,3,4-tetrahydro-2,4-pyrimidinedione was prepared. 27 g. of the syrup are treated with 20 ml. of 35% aqueous sodium hydroxide solution. The syrup completely dissolves and the temperature rises rapidly to about 75° C. Vigorous stirring is maintained for a few minutes until the temperature begins to drop. An oily product separates which, on further cooling and stirring, solidifies. Filtration, washing with water and air drying yield the crude 1-isopropyl - 3 - methyl-6-amino-1,2,3,4-tetrahydro-2,4-pyrimidinedione. After drying for 12 hours at 80° C., a melting point of 210–212° C. is obtained.

EXAMPLE 2

*N-methyl-N-cyanoacetyl-N'-isopropylthiourea*

51 grams of methyl isothiocyanate are dissolved in 300 ml. of benzene. With rapid stirring and cooling the solution is treated over a period of 25 minutes with a cooled solution of 52.7 g. of isopropylamine in 200 ml. of benzene. The reaction is exothermic and the addition is conducted at such a rate that the temperature remains at 20–25° C. Stirring is continued for 30 minutes. The N - isopropyl-N'-methyl-thiourea crystallizes out. One cools, filters, washes with benzene and finally with petroleum ether. 91 g. of the urea derivative are obtained in hexagonal plates, melting at 98–100° C.

26.4 g. of this urea are dissolved in 75 ml. of acetic anhydride and treated with 20.5 g. of cyanoacetic acid. On heating for 2 hours at 60° C. a very deep red color develops. If, instead, one heats for only 15 minutes at 75° C. a much lighter color is obtained. The solvent is removed under vacuum as far as practical. One then adds 60 ml. of water and resumes the distillation until 50 g. of a thick, red syrup are obtained, consisting of N-methyl-N-cyanoacetyl-N'-isopropylthiourea. A colorless liquid is obtained by distillation at 25 microns pressure.

To establish the structure of this compound, 40 g. of this syrup are mixed with 40 ml. of water and treated with 6 ml. of 70% sodium hydroxide. The alkali is suitably added in 1-ml. portions, to prevent heating. The syrup dissolves and, almost immediately thereafter, there is a precipitation of a yellowish solid. After standing for a half hour one dilutes with 50 ml. of water, filters, washes with water and dries. 34 g. of crude 1 - isopropyl - 2 - thio - 3 - methyl-6-amino - 1,2,3,4 - tetrahydro-2,4-pyrimidinedione are thus obtained. Upon recrystallization from glacial acetic acid, colorless needles form, which melt at 247–248° C.

EXAMPLE 3

*N-ethyl-N-cyanoacetyl-N'-propylurea*

To an ice-cooled solution of 63 g. of ethyl isocyanate in 300 ml. of benzene are added, with stirring, a solution of 54.5 g. of n-propylamine in 200 ml. of benzene, the temperature of the reaction being held at about 15 to 25° C. After completion of the addition, the solvent is removed by vacuum distillation. The residual syrup crystallizes on cooling to give 108 g. of N-propyl-N'-ethylurea in practically pure form. On recrystallization from 10 parts of petroleum ether, needles melting at 79–80° C. are obtained.

This urea derivative may be obtained by a more economical method by adding 21.6 g. of ethylcarbamyl chloride dropwise into an ice-cooled mixture of 12 g. of n-propylamine, 11.5 ml. of 70% sodium hydroxide and about 40 g. of crushed ice. The reaction is very vigorous and upon its completion the N-propyl-N'-ethylurea precipitates. It may be purified by recrystallization from petroleum ether as above and needles melting at 79–80° C. are obtained.

A mixture of 97 g. of the crude N-propyl-N'-ethylurea, 76.5 g. of cyanoacetic acid and 190 ml. of acetic anhydride is heated at 70–80° C. The heat of reaction at the start may necessitate removal of the container from the bath until the main reaction is completed. The solvent is removed as completely as possible by vacuum distillation at 70–80° C. Then 150 ml. of water are added to the syrup and the solvent is again distilled off as completely as possible. N-ethyl-N-cyanoacetyl-N'-n-propylurea is obtained as a syrup.

To establish the structure of this compound it was ring closed. 100 g. of the syrup are stirred with 150 ml. of water at 20° C. and treated with 25 ml. of a 70% (by weight) aqueous solution of sodium hydroxide. The syrup dissolves completely, but almost immediately, a second, oily product is deposited. The temperature rises to 70–75° C. then drops again. On cooling and stirring, the oil rapidly crystallizes. Filtration, washing with water and air drying gives 66 g. of crude product. Two recrystallizations from hot ethyl acetate and air drying yield 47 g. of 1-propyl-3-ethyl-6-amino-1,2,3,4-tetrahydro - 2,4-pyrimidinedione monohydrate in the form of diamond-shaped plates, melting at 86–87° C. To obtain the anhydrous product one heats for 24 hours at 80° C. and recrystallizes from 10 parts of ethyl acetate. The fine white needles melt at 166–167° C.

EXAMPLE 4

N-ethyl-N-cyanoacetyl-N'-propylthiourea 30 g. of 1-n-propyl-3-ethylthiourea are dissolved in 75 ml. of acetic anhydride and treated with 20 g. of cyanoacetic acid. One heats for 20 minutes at 70–75° C. and vacuum distils to remove the solvent as far as convenient. Then one adds 100 ml. of water and resumes the distillation to obtain the N-ethyl-N-cyanoacetyl-N'-propylthiourea. This syrup is cyclized by treatment with slightly more than the necessary amount of 20% sodium hydroxide to make the solution alkaline to phenolphthalein paper. The alkali is added slowly so as to avoid excessive heat development. Crystallization occurs soon thereafter. The yellowish precipitate of 1-n-propyl-2-thio-3-ethyl-6-amino - 1,2,3,4 - tetrahydro-2,4-pyrimidinedione is filtered and washed with water and may be obtained in colorless form by recrystallization from dilute ethanol.

EXAMPLE 5

N-ethyl-N-cyanoacetyl-N'-isopropylurea

From 79 g. of ethyl isocyanate in 300 ml. of benzene and 82 g. of isopropylamine in 200 ml. of benzene one obtains, by using the procedure of Example 3, 134 g. of N-isopropyl-N'-ethylurea, which, on recrystallization from ethyl acetate, melts at 158–159° C. 91 g. of the crude product is reacted with 71 g. of cyanoacetic acid and 175 ml. of acetic anhydride as in Example 3 to obtain 160 g. of a syrup, consisting of N-ethyl-N-cyanoacetyl-N'-isopropylurea.

100 g. of this syrup in 150 ml. of water are then reacted with 30 ml. of a 70% aqueous solution of sodium hydroxide. Proceeding as in Example 3 one obtains 64 g. of crude 1-isopropyl-3-ethyl-6-amino-1,2,3,4-tetrahydro - 2,4 - pyrimidinedione, which on two recrystallizations from methanol and drying at 80° C. for 12 hours gives 27 g. of cubical prisms melting at 200–201° C. containing no water of crystallization.

EXAMPLE 6

N,N'-di-n-propyl-N-cyanoacetylurea 270 ml. of a cooled 70% sodium hydroxide solution are added to a solution of 300 g. of n-propylamine in 650 ml. of ice water in a 5-liter flask with mechanical stirring. A solution of 263 g. of phosgene in 1320 ml. of benzene, prepared at 20° C. is added to the reaction mixture with cooling at 0–5° C. in the course of two hours. Toward the end of the reaction, the temperature is permitted to rise to about 11° C. Stirring is continued for a half hour. The aqueous layer is separated and washed with benzene, the benzene solutions are united and dried over anhydrous sodium sulfate. The benzene is then distilled off.

372 g. of the resultant di-n-propylurea are dissolved in 335 ml. of glacial acetic acid and 745 ml. of acetic anhydride. Then 238 g. of cyanoacetic acid are added and the mixture kept at 60–65° C. for 2 hours. Most of the solvent is then distilled off at 80° C. and 10 mm. pressure. After addition of 200 ml. of water, the distillation is resumed and the N,N'-di-n-propyl-N-cyanoacetylurea obtained as a syrup. This syrup may be purified by high vacuum distillation at 80–100° C. and at 20–30 microns pressure. The distillate is a colorless liquid.

To obtain the pyrimidine derivative 550 ml. of a 10% sodium hydroxide solution are added to this nitrile and the pH adjusted to fairly strong alkalinity to phenolphthalein. The solution becomes hot and an oil is formed which on stirring and cooling crystallizes. The resultant monohydrate of 1,3-di-n-propyl - 6 - amino - 1,2,3,4-tetrahydro-2,4-pyrimidinedione is recrystallized from 20% ethanol. The white crystals soften at 94° C. and melt at 98–100° C. By drying at 80° C. for 8 hours anhydrous crystals are obtained which melt at 136–138.5° C.

EXAMPLE 7

N,N'-di-n-propyl-N-cyanoacetylthiourea 27 g. of 1,3-di-n-propylthiourea are dissolved in 50 ml. of acetic anhydride and 50 ml. of acetic acid. To this solution one adds 17 g. of cyanoacetic acid and heats for 20 minutes at 55° C. Most of the solvent is then removed by vacuum distillation at a bath temperature of 50° C. 25 ml. of water are added and the distillation resumed until the syrup of N,N'-di-n-propyl-N-cyanoacetylthiourea is obtained.

This syrup material is cyclized by addition of 20% sodium hydroxide, until the pH reaches 10. One stirs until crystallization occurs, cools, filters and washes repeatedly with water. In order to obtain colorless crystals of 1,3-di-n-propyl-2-thio - 6-amino-1,2,3,4-tetrahydro-2,4-pyrimidinedione one recrystallizes from 20% ethanol.

EXAMPLE 8

N-ethyl-N-cyanoacetyl-N'-n-butylurea

Proceeding as in Example 3, 108 g. of crude N-ethyl-N'-n-butylurea, which may be prepared by the method of E. M. Schultz (J. Am. Chem. Soc. 69, 1056, 1947), is reacted with 76.5 g. of cyanoacetic acid and 200 ml. of acetic anhydride to obtain 185 g. of syrup consisting of N-ethyl-N-cyanoacetyl-N'-n-butylurea. To establish the structure of this compound 50 g. of this syrup are treated with 50 ml. of water and 10 ml. of 70% sodium hydroxide solution, and 44 g. of crude 1-n-butyl-3-ethyl-6-amino - 1,2,3,4-tetrahydro-2,4-pyrimidinedione are obtained. The latter is twice recrystallized by dissolving in 5 parts of ethyl acetate and adding 4 parts of petroleum ether. 24 g. of the monohydrate is thus obtained as a colorless solid of indefinite crystalline form, melting at 70–72° C.

EXAMPLE 9

N,N'-di-n-butyl-N-cyanoacetylurea 344 g. of di-n-butylurea are dissolved in 700 ml. of glacial acetic acid and 700 ml. of acetic anhydride, and 224 g. of cyanoacetic acid are added. Operating as in Example 6, one obtains the N,N'-di-n-butyl-N-cyanoacetylurea in the form of a syrup, which can be purified by vacuum distillation at 25 microns.

Cyclization by the usual method yields white crystals of a hydrate of 1,3-di-n-butyl-6-amino-1,2,3,4 - tetrahydro - 2,4 - pyrimidinedione, which melt at 100–104° C.

EXAMPLE 10

N,N'-di-isobutyl-N-cyanoacetylthiourea 10 g. of 1,3-di-isobutylthiourea are dissolved in 20 ml. of glacial acetic acid, and 20 ml. of acetic anhydride. One then adds 5.7 g. of cyanoacetic acid, heats for 20 minutes at 60° C. and vacuum distils at a bath temperature of 50° C. until most of the solvent is removed. 10 ml. of water are added and the distillation resumed until the N,N'-di-isobutyl-N-cyanoacetyl-thiourea forms a thick syrup.

To cyclize this material, one adds 10% sodium hydroxide to bring the pH to 7 and then a further small quantity of 70% sodium hydroxide to raise the pH to about 10. The solution becomes rather hot and one stirs until the crystallization begins. One filters and washes repeatedly with water. The resultant crystals of 1,3-di-isobutyl-2-thio-6-amino - 1,2,3,4 - tetrahydro-2,4-pyrimidinedione are usually yellowish. To obtain clear crystals one recrystallizes from a large volume of dilute ethanol and uses charcoal as clarifying agent.

EXAMPLE 11

N-ethyl-N-cyanoacetyl-N'-hexylurea

To an ice-cooled solution of 71 g. of ethyl isocyanate in 300 ml. of benzene is added, with stirring, a solution of 90 g. of hexylamine in 200 ml. of benzene. One cools to control the reaction and, upon its completion, evaporates the solvent by vacuum distillation.

123 g. of N-n-hexyl-N'-ethylurea, 250 ml. of acetic anhydride, 80 g. of glacial acetic acid and 80 g. of cyanoacetic acid are heated for 2 hours at 55–65° C. Vacuum distillation removes most of the solvent. One then adds 150 ml. of water and resumes the vacuum distillation until all of the solvent has disappeared. The N-ethyl-N-cyanoacetyl-N'-hexylurea is thus obtained as a syrup. In order to bring about ring closure enough 10% sodium hydroxide is added to make the solution alkaline to phenolphthalein. One warms to 70° C. and the temperature is maintained at 70–80° C. Upon cooling a waxy material is obtained, which on washing with water and repeated recrystallization from ethanol yields 1-hexyl-3-ethyl-6-amino - 1,2,3,4 - tetrahydro-2,4-pyrimidinedione. The white crystals melt at 160–163° C.

EXAMPLE 12

N-ethyl-N-cyanoacetyl-N'-cyclohexylurea

To an ice-cooled solution of 142 g. of ethyl isocyanate in 400 ml. of benzene is gradually added, with stirring, a solution of 188 g. of cyclohexylamine in 300 ml. of benzene, the temperature being held below 30° C. Partial crystallization occurs during the reaction. The mixture is transferred to a large dish and the solvent evaporated on a steam bath. The colorless, crystalline residue, consisting of practically pure N-cyclohexyl-N'-ethylurea weighs 316 g. Recrystallization from 10 parts of ethyl acetate gives needles melting at 113–115° C.

A mixture of 316 g. of N-ethyl-N'-cyclohexylurea, 190 g. cyanoacetic acid and 600 ml. of acetic anhydride is heated for 3 hours on a water bath held at about 90° C. The solvent is removed as far as possible by vacuum distillation, the syrup poured into a beaker, covered with 200 ml. of water and stirred. The syrup crystallizes rapidly; the crystals are filtered, washed with water and recrystallized from 8 parts of 50% aqueous ethanol, using charcoal to decolorize. A second recrystallization from the same solvent gives 300 g. of pure N-ethyl-N-cyanoacetyl-N'-cyclohexylurea as rectangular plates, melting at 110–112° C. A mixed melting point with the starting material, N-cyclohexyl-N'-ethylurea, gives a depressed melting point of about 90–95° C. showing the nonidentity of the two products.

100 g. of this crystalline N-ethyl-N-cyanoacetyl-N'-cyclohexylurea in 150 ml. of water are reacted with 25 ml. of a 70% aqueous solution of sodium hydroxide. Proceeding as in Example 3, a 30% yield of 1-cyclohexyl-3-ethyl-6-amino-1,2,3,4-tetrahydro-2,4-pyrimidinedione is obtained.

EXAMPLE 13

N-ethyl-N-cyanoacetyl-N'-benzylthiourea 20 g. of 1-benzyl-3-ethyl-thiourea are dissolved in 40 ml. of glacial acetic acid and 40 ml. of acetic anhydride. One then adds 11.8 g. of cyanoacetic acid, heats for 15 minutes at 60° C. and vacuum distils at a bath temperature of 50° C. until most of the solvent is removed. 20 ml. of water are added and the distillation is resumed. A thick syrup is obtained which consists of N-ethyl-N-cyanoacetyl-N'-benzylthiourea.

In order to effect ring closure one adds a 20% aqueous sodium hydroxide solution to raise the pH to about 10. The solution becomes rather hot and one stirs until a precipitate begins to form. The yellow crystals of 1-benzyl-2-thio-3-ethyl - 6 - amino - 1,2,3,4 - tetrahydro - 2,4 - pyrimidinedione are filtered and washed repeatedly with water. White crystals may be obtained by crystallization from 50% ethanol using charcoal.

EXAMPLE 14

N,N'-dibenzyl-N-cyanoacetylurea 290 g. of dibenzylurea are dissolved in 350 ml. of glacial acetic acid and 350 ml. of acetic anhydride. 120 g. of cyanoaectic acid are added and the mixture kept at 60–65° C. for 2 hours. The solvent is evaporated in vacuum on the steam bath. After removal of about 500 ml. of solvent, the N,N'-dibenzyl-N-cyanoacetylurea begins to crystallize.

Cyclization may be accomplished by treatment of a dilute alcoholic solution with alkali. The 1,3 - dibenzyl - 6 - amino - 1,2,3,4 - tetrahydro - 2,4-pyrimidinedione may be crystallized from 50% ethanol, the colorless crystals melting at about 120–125° C.

We claim:

1. A compound of the structural formula

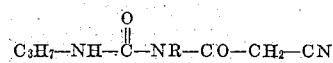

wherein R is an alkyl group of no more than three carbon atoms.

2. A compound of the structural formula $C_3H_7-NH-CO-N(C_2H_5)-CO-CH_2-CN$

VIKTOR PAPESCH.
ELMER F. SCHROEDER.

REFERENCES CITED

The following references are of record in the file of this patent:

UNITED STATES PATENTS

| Number | Name | Date |
|---|---|---|
| 2,313,498 | Allen et al. | Mar. 9, 1943 |

FOREIGN PATENTS

| Number | Country | Date |
|---|---|---|
| 175,415 | Germany | Sept. 14, 1906 |

OTHER REFERENCES

Beilstein (Handbuch, 4th ed.), vol. 4, p. 77 (1922).